United States Patent [19]
Barkalow et al.

[11] Patent Number: 5,405,623
[45] Date of Patent: Apr. 11, 1995

[54] CHEWING GUM COMPOSITIONS AND METHODS FOR MANUFACTURING SAME

[75] Inventors: David G. Barkalow, Deerfield; Michael J. Greenberg, Northbrook; Albert H. Chapdelaine, Naperville; Philip W. Urnezis, Lombard, all of Ill.

[73] Assignee: Wm. Wrigley Jr. Company, Chicago, Ill.

[21] Appl. No.: 125,296

[22] Filed: Sep. 22, 1993

[51] Int. Cl.6 ............................................. A23G 3/30
[52] U.S. Cl. ............................................ 426/5; 426/512
[58] Field of Search ................................. 426/3–6, 426/512

[56] References Cited

U.S. PATENT DOCUMENTS

| | | | |
|---|---|---|---|
| 3,973,041 | 8/1976 | DuRoss | 426/3 |
| 4,252,794 | 2/1981 | DuRoss | 424/176 |
| 4,803,083 | 2/1989 | Chapdelaine | 426/3 |
| 4,959,226 | 9/1990 | Chapdelaine | 426/3 |
| 5,023,092 | 6/1991 | DuRoss | 426/3 |
| 5,075,291 | 12/1991 | DuRoss | 514/60 |
| 5,178,850 | 1/1993 | DuRoss | 424/48 |

*Primary Examiner*—Jeanette Hunter
*Attorney, Agent, or Firm*—Hill, Steadman & Simpson

[57] ABSTRACT

Methods and compositions for providing improved processability for chewing gum. Pursuant to the present invention, the particle size of the sorbitol component is chosen so that a chewing gum composition is created that is sufficiently firm for processability through a typical chewing gum manufacturing process. To this end, a method is provided for regulating the firmness of a chewing gum composition including sorbitol comprising the step of selecting the particle size distribution of the sorbitol so as to create a chewing gum having desired firmness. By choosing sorbitol with reduced particle sizes, a firm chewing gum is achieved. Likewise, by choosing sorbitol with an increased particle size, a softer chewing gum is achieved.

20 Claims, 6 Drawing Sheets

CHEWING GUM COMPOSITIONS AND METHODS FOR MANUFACTURING SAME

BACKGROUND OF THE INVENTION

The present invention relates generally to chewing gum compositions. More specifically, the present invention relates to optimizing the processability of chewing gums and chewing gum compositions.

In formulating chewing gum, in part, one attempts to select formulations that provide optimum texture and processability characteristics. However, at times, the processing characteristics of chewing gum may suffer because of other characteristics one may want the chewing gum to exhibit.

One issue in processing chewing gum, especially sugarless chewing gum, is with respect to the softness/firmness of the chewing gum. It is necessary for the chewing gum to be sufficiently soft and flexible during the extrusion process. On the other hand, when the chewing gum is cut into sticks, if the gum is too soft or sticky, it will cause processing difficulties. Likewise, if chewing gum is too soft, it can cause wrapping difficulties. For example, if chewing gum is too soft and/or sticky, it will be smeared by the cutting equipment and will be impossible to wrap.

On the other hand, if the chewing gum is too rigid, it can also cause problems. For example, a chewing gum that is too dry can crack or break, and be difficult to sheet and wrap.

One component that has been considered in optimizing the texture and processability of chewing gum is sorbitol. Sorbitol is a component of many chewing gums especially sugarless chewing gums. In this regard, sorbitol, as well as other sugar alcohols, acts as a sugarless sweetener and bulking agent. Chewing gum manufacturers have found that sorbitols from different suppliers and different sorbitols from the same supplier provide different textures during processing and to the resultant chewing gum that effects the processability of the chewing gum.

U.S. Pat. Nos. 4,803,083 and 4,959,226 relate to methods of optimizing texture and processability of chewing gum containing sorbitol by using at least two different types of powdered sorbitol and making sample batches of gum therefrom. The ratio between the two types of powdered sorbitol is varied between sample batches in order to optimize texture and processability of the gum. By varying the ratio of the two different types of sorbitol, desired processability and texture can be achieved.

Although it is desirable, in at least certain applications, to produce chewing gums having increased moisture and/or flavor, certain processing difficulties prevent or limit one's ability to achieve same. In this regard, increased levels of moisture and/or flavor can result in a softer chewing gum during processing. Therefore, difficulties in processing, e.g., cutting and wrapping, the chewing gum can prevent the use of certain levels of moisture and flavor.

In a similar vein, in certain situations, the chewing gum during processing may be too rigid. Although the chewing gum could be softened by using increased levels of moisture or flavor, this may not be desirable for the particular chewing gum being constructed. For example, when using aspartame, it may be desirable to use a low moisture containing chewing gum composition to prevent degradation of the aspartame. Therefore, although it may be desirable to soften such a chewing gum, it would not be desirable to add moisture thereto.

There is therefore a need for an improved method of manufacturing gum so as to allow one to regulate and/or vary the softness/firmness of the chewing gum. There is still further a need for a method for allowing additional moisture and/or flavor to be used in a chewing gum, but still provide necessary processability.

SUMMARY OF THE INVENTION

The present invention provides methods and compositions for providing improved processability for chewing gum. Pursuant to the present invention, the particle size of the sorbitol component is chosen so that a chewing gum composition is created that is sufficiently firm for processability through a typical chewing gum manufacturing process.

To this end, the present invention provides a method for regulating the firmness during processing of a chewing gum composition that includes sorbitol comprising the step of selecting the particle size distribution of the sorbitol so as to create a chewing gum having desired firmness during processing. By choosing sorbitol with reduced particle sizes, a firm chewing gum is achieved during processing. Likewise, by choosing sorbitol with an increased particle size, a softer chewing gum is achieved during processing.

In an embodiment, the sorbitol has a particle size having less than 2% larger than 80 mesh (177 microns).

In an embodiment, the sorbitol has a particle size having less than 2% larger than 100 mesh (149 microns).

In an embodiment, the sorbitol has a particle size having less than 2% larger than 140 mesh (105 microns).

In an embodiment, the sorbitol has a particle size distribution of:

<2% retained on #80 sieve (greater than 177 microns);
10–25% retained on #100 sieve (149–177 microns);
20–50% retained on #140 sieve (105–149 microns);
10–30% retained on #200 sieve (74–105 microns); and
10–50% passed through #200 sieve (less than 74 microns).

In an embodiment, the chewing gum composition is sugar free.

In an embodiment, the sorbitol comprises approximately 30% to about 70% of the chewing gum composition.

In a further embodiment, the present invention provides a method for increasing moisture in a chewing gum, that includes sorbitol, as compared to a similar chewing gum composition that also includes sorbitol, but maintaining similar processability as the similar chewing gum. The method comprises the steps of increasing the moisture in the formulation and reducing the particle size of the sorbitol that is used in the chewing gum formula as compared to the similar chewing gum.A

In a still further embodiment, the present invention provides a method for increasing glycerin content in a chewing gum, that includes sorbitol, as compared to a similar chewing gum composition that also includes sorbitol, but maintaining similar processability as the similar chewing gum. The method comprises the steps of increasing the glycerin content in the formulation and reducing the particle size of the sorbitol that is used in the chewing gum formula as compared to the similar chewing gum.

In another embodiment, the present invention provides a method for increasing flavor in a chewing gum, that includes sorbitol, as compared to a similar chewing gum but maintaining similar processability as the similar chewing gum composition. The method comprises the steps of increasing the flavor in the formulation and reducing the particle size of the sorbitol as compared to the similar chewing gum.

It is an advantage of the present invention to provide an improved method for manufacturing chewing gum.

Further, an advantage of the present invention is to provide a method for allowing increased moisture to be added to a chewing gum composition while maintaining the processability of the chewing gum composition.

Additionally, an advantage of the present invention is to provide a method for allowing increased glycerin to be added to a chewing gum composition while maintaining the processability of the chewing gum composition.

Another advantage of the present invention is to provide a method for allowing increased flavor to be added to a chewing gum composition while still providing necessary processability.

Moreover, an advantage of the present invention is to provide a method for improving the characteristics provided by sorbitol by a method other than based solely on sorbitol's particle morphology.

Furthermore, an advantage of the present invention is to provide a method for allowing one to create chewing gums that are either more rigid, or softer, during processing, depending on desired characteristics.

Additional features and advantages of the present invention are described in, and will be apparent from, the detailed description of the presently preferred embodiments and from the drawings.

DETAILED DESCRIPTION OF THE PRESENTLY PREFERRED EMBODIMENTS

The present invention provides methods, as well as compositions, for improving the processability and texture of chewing gum. It has been found that by selecting specific particle sizes of sorbitol, one can influence the softness or rigidity of the chewing gum composition during processing. This provides, as set forth in detail below, many advantages from a manufacturing standpoint, as well as with respect to the resultant gum composition.

Although, preferably, the present invention is used with sugarless chewing gums—because they typically contain sorbitol—the present invention can be used with any chewing gum that includes sorbitol.

Chewing gum generally consists of a water insoluble gum base, a water soluble portion, and flavors. The water soluble portion dissipates with a portion of the flavor over a period of time during chewing. The gum base portion is retained in the mouth throughout the chew.

The insoluble gum base generally comprises elastomers, resins, fats and oils, softeners, and inorganic fillers. The gum base may or may not include wax. The insoluble gum base can constitute approximately 5 to about 95 percent, by weight, of the chewing gum, more commonly, the gum base comprises 10 to about 50 percent of the gum, and in some preferred embodiments, 20 to about 35 percent, by weight, of the chewing gum.

In an embodiment, the chewing gum base of the present invention contains about 20 to about 60 weight percent synthetic elastomer, 0 to about 30 weight percent natural elastomer, about 5 to about 55 weight percent elastomer plasticizer, about 4 to about 35 weight percent filler, about 5 to about 35 weight percent softener, and optional minor amounts (about one percent or less) of miscellaneous ingredients such as colorants, antioxidants, etc.

Synthetic elastomers may include, but are not limited to, polyisobutylene with GPC weight average molecular weight of about 10,000 to about 95,000, isobutylene-isoprene copolymer (butyl elastomer), styrene-butadiene copolymers having styrene-butadiene ratios of about 1:3 to about 3:1, polyvinyl acetate having GPC weight average molecular weight of about 2,000 to about 90,000, polyisoprene, polyethylene, vinyl acetate-vinyl laurate copolymer having vinyl laurate content of about 5 to about 50 percent by weight of the copolymer, and combinations thereof.

Preferred ranges are, for polyisobutylene, about 50,000 to about 80,000 GPC weight average molecular weight, for styrene-butadiene, about 1:1 to about 1:3 bound styrene-butadiene, for polyvinyl acetate, about 10,000 to about 65,000 GPC weight average molecular weight with the higher molecular weight polyvinyl acetates typically used in bubble gum base, and for vinyl acetate-vinyl laurate, vinyl laurate content of 10–45 percent.

Natural elastomers may include natural rubber such as smoked or liquid latex and guayule as well as natural gums such as jelutong, lechi caspi, perillo, sorva, massaranduba balata, massaranduba chocolate, nispero, rosindinha, chicle, gutta hang kang, and combinations thereof. The preferred synthetic elastomer and natural elastomer concentrations vary depending on whether the chewing gum in which the base is used is adhesive or conventional, bubble gum or regular gum. Preferred natural elastomers include jelutong, chicle, sorva and massaranduba balata.

Elastomer plasticizers may include, but are not limited to, natural rosin esters such as glycerol esters of partially hydrogenated rosin, glycerol esters polymerized rosin, glycerol esters of partially dimerized rosin, glycerol esters of rosin, pentaerythritol esters of partially hydrogenated rosin, methyl and partially hydrogenated methyl esters of rosin, pentaerythritol esters of rosin; synthetics such as terpene resins derived from alpha-pinene, beta-pinene, and/or d-limonene; and any suitable combinations of the foregoing. the preferred elastomer plasticizers will also vary depending on the specific application, and on the type of elastomer which is used.

Fillers/texturizers may include magnesium and calcium carbonate, ground limestone, silicate types such as magnesium and aluminum silicate, clay, alumina, talc, titanium oxide, mono-, di- and tri-calcium phosphate, cellulose polymers, such as wood, and combinations thereof.

Softeners/emulsifiers may include tallow, hydrogenated tallow, hydrogenated and partially hydrogenated vegetable oils, cocoa butter, glycerol monostearate, glycerol triacetate, lecithin, mono-, di- and triglycerides, acetylated monoglycerides, fatty acids (e.g. stearic, palmitic, oleic and linoleic acids), and combinations thereof.

Colorants and whiteners may include FD&C-type dyes and lakes, fruit and vegetable extracts, titanium dioxide, and combinations thereof.

The base may or may not include wax. An example of a wax-free gum base is disclosed in U.S. Ser. No. 07/906,921, the disclosure of which is incorporated herein by reference.

In addition to a water insoluble gum base portion, a typical chewing gum composition includes a water soluble bulk portion and one or more flavoring agents. The water soluble portion can include bulk sweeteners, high intensity sweeteners, flavoring agents, softeners, emulsifiers, colors, acidulants, fillers, antioxidants, and other components that provide desired attributes.

Softeners are added to the chewing gum in order to optimize the chewability and mouth feel of the gum. The softeners, which are also known as plasticizers and plasticizing agents, generally constitute between approximately 0.5 to about 15% by weight of the chewing gum. The softeners may include glycerin, lecithin, and combinations thereof. Aqueous sweetener solutions such as those containing sorbitol, hydrogenated starch hydrolysates, corn syrup and combinations thereof, may also be used as softeners and binding agents in chewing gum.

Bulk sweeteners include both sugar and sugarless components. Bulk sweeteners typically constitute 5 to about 95% by weight of the chewing gum, more typically, about 20 to about 80% by weight, and more commonly, about 30 to about 60% by weight of the gum.

Sugar sweeteners generally include saccharide-containing components commonly known in the chewing gum art, including, but not limited to, sucrose, dextrose, maltose, dextrin, dried invert sugar, fructose, levulose, galactose, corn syrup solids, and the like, alone or in combination.

Sorbitol can be used as a sugarless sweetener. Additionally, sugarless sweeteners can include, but are not limited to, other sugar alcohols such as mannitol, xylitol, hydrogenated starch hydrolysates, maltitol, and the like, including combinations of same.

High intensity artificial sweeteners can also be used, alone or in combination with the above. Preferred sweeteners include, but are not limited to sucralose, aspartame, salts of acesulfame, alitame, saccharin and its salts, cyclamic acid and its salts, glycyrrhizin, dihydrochalcones, thaumatin, monellin, and the like, alone or in combination. In order to provide longer lasting sweetness and flavor perception, it may be desirable to encapsulate or otherwise control the release of at least a portion of the artificial sweetener. Such techniques as wet granulation, wax granulation, spray drying, spray chilling, fluid bed coating, coacervation, and fiber extension may be used to achieve the desired release characteristics.

Usage level of the artificial sweetener will vary greatly and will depend on such factors as potency of the sweetener, rate of release, desired sweetness of the product, level and type of flavor used and cost considerations. Thus, the active level of artificial sweetener may vary from 0.02 to about 8%. When carriers used for encapsulation are included, the usage level of the encapsulated sweetener will be proportionately higher.

Combinations of sugar and/or sugarless sweeteners may be used in chewing gum. Additionally, the softener may also provide additional sweetness such as with aqueous sugar or alditol solutions.

If a low calorie gum is desired, a low caloric bulking agent can be used. Examples of low caloric bulking agents include: polydextrose; oligofructose; Fructooligosaccharides (NutraFlora); Palatinose oligosaccharide; Guar Gum Hydrolysate (Sun Fiber); or indigestible dextrin (Fibersol). However, other low calorie bulking agents can be used.

A variety of flavoring agents can be used. The flavor can be used in amounts of approximately 0.1 to about 15 weight percent of the gum, and preferably, about 0.2 to about 5%. Flavoring agents may include essential oils, synthetic flavors or mixtures thereof including, but not limited to, oils derived from plants and fruits such as citrus oils, fruit essences, peppermint oil, spearmint oil, other mint oils, clove oil, oil of wintergreen, anise and the like. Artificial flavoring agents and components may also be used. Natural and artificial flavoring agents may be combined in any sensorially acceptable fashion.

The present invention, it is believed, can be used with any process for manufacturing chewing gum.

Chewing gum is generally manufactured by sequentially adding the various chewing gum ingredients to commercially available mixers known in the art. After the ingredients have been thoroughly mixed, the chewing gum mass is discharged from the mixer and shaped into the desired form, such as by rolling into sheets and cutting into sticks, extruding into chunks, or casting into pellets. Generally, the ingredients are mixed by first melting the gum base and adding it to the running mixer. The gum base may alternatively be melted in the mixer. Color and emulsifiers can be added at this time.

A softener, such as glycerin, can be added next along with syrup and part of the bulk portion. Further, parts of the bulk portion may then be added to the mixer. Flavoring agents are typically added with the final part of the bulk portion. The entire mixing process typically takes from 5 to 15 minutes, although longer mixing times are sometimes required. Those skilled in the art will recognize that variations of this general mixing procedure, or other mixing procedures, can be followed.

As noted above, sorbitol can be used as a sugarless sweetener as well as a softener or binding agent. Sorbitol, in a solid state, exists in a number of different crystalline forms. The most common forms are the alpha, beta, gamma, and delta forms. Commercially available sorbitols usually are either a mixture of alpha and beta forms or are nearly all gamma forms. Sorbitol that is predominately one crystalline form may include amounts of sorbitol in other crystalline forms, as well as impurities such as mannitol. As used herein, "sorbitol" includes sorbitol containing such impurities within commercially acceptable limits.

Various crystalline-type sorbitols are available from various suppliers. ICI Americas, Inc. of Wilmington, Del. produces a gamma sorbitol called XS834.

Pfizer Chemical Co., 235 E. 42nd St., New York, N.Y has a sorbitol that is reported to be 60% to 80% beta sorbitol called Pfizer crystalline coarse powder. Additionally, various gamma-type sorbitols are available from the Roquette Corporation, 1550 Northwestern Ave., Gurnee, Ill.

Different manufacturing processes also produce powdered sorbitols having different particle morphologies, which can be viewed by placing sorbitol particles in an oil immersion and viewing them with a microscope. The ICI XS834 particles appeared crystalline in nature, composed of longitudinally arranged, needle shaped crystals, which span the length of the particle. Particles are mostly rod and rectangular shaped.

The Roquette Neosorb P60 and Pfizer sorbitols have particles that appear as irregular granular shapes. Few cleavage planes or smooth surfaces were observed. The exterior of the particles were irregular and roughly spherical. The crystals were needle-like and significantly shorter than the particle length. Crystals were more randomly oriented than in the ICI sorbitol particles.

This difference in particle morphology between ICI and the other morphology of Roquette and Pfizer is believed to cause the differences that improve processing of the Pfizer and Roquette sorbitols through controlling particle size and not the ICI sorbitols. The particle morphology of Pfizer and Roquette sorbitols may allow faster absorption of liquids due to its amorphous type particle morphology.

Sorbitols are commercially available in different particle size distributions.

For example, Pfizer coarse powder sorbitol product typically has the following range:
- 40–63% retained on #80 sieve (greater than 177 microns);
- 6–15% retained on #100 sieve (149–177 microns);
- 14–25% retained on #140 sieve (105–149 microns);
- 4–20% retained on #200 sieve (74–105 microns); and
- 0–20% passed through #200 sieve (smaller than 74 microns).

The Roquette Sorbitol P60 product typically has the following particle size distribution:
- 36–55% retained on #80 sieve (greater than 177 microns);
- 5–15% retained on #100 sieve (149–177 microns);
- 10–20% retained on #140 sieve (105–149 microns);
- 5–15% retained on #200 sieve (74–105 microns); and
- 10–25% passed through #200 sieve (smaller than 74 microns).

The inventors have found that by reducing the particle size of sorbitols such as the Pfizer and Roquette sorbitols, a firmer, quicker setting gum is achieved. By selecting the appropriate particle size, a sufficiently firm chewing gum can be achieved, even, for sugarless chewing gum, yet the chewing gum is sufficiently elastic to sheet. The increased firmness will assist in increasing production efficiency and wrappability of what are typically soft chewing gum products.

ICI XS834 sorbitol is available in the following particle size range:
- 40–65% retained on #80 sieve
- 6–15% retained on #100 sieve
- 10–20% retained on #140 sieve
- 5–20% retained on #200 sieve
- 0–20% through #200 sieve.

However, another particle size distribution of ICI gamma sorbitol is also available. Its particle distribution is the following:
- 2–5% retained on #60 sieve
- 1–3% retained on #100 sieve
- 20–35% retained on #200 sieve
- 55–75% passed through #200 sieve.

As discussed above, it has been found that even though the ICI product has a fine particle size, it does not give the desired effect of increased torque (see Examples 18 and 19).

Pursuant to the present invention, in an embodiment, the sorbitol is selected so as to provide a sufficiently firm chewing gum for processing. In this regard, preferably, the sorbitol has a particle distribution as follows:
- 0 to 2% retained on #80 sieve
- 10 to 25% retained on #100 sieve
- 20 to 50% retained on #140 sieve
- 10 to 30% retained on #200 sieve
- 10 to 50% passed through #200 sieve.

More preferably, the sorbitol has a particle size distribution as follows:
- 0 to 2% retained on #140 mesh
- 30 to 70% retained on #200 mesh
- 30 to 70% through #200 mesh.

If desired, the particle size of the sorbitol can be chosen so that they are larger than that which may typically be used. This will provide a softer chewing gum for processing. In certain circumstances, chewing gums may be too firm and it may be desirable to soften the chewing gum during processing. By choosing the sorbitol particle size to be larger than that which is typically commercially available, one can soften the chewing gum for processing.

The present invention also allows one to provide a chewing gum formulation having increased moisture. Due to the use of the sorbitols having reduced particle size, increased moisture, greater than that typically used in chewing gum formulation, can be used. For example, moisture levels of the overall gum formulation can be increased by about 0.1 to 1.0% and still provide sufficiently rigid chewing gum to allow it to be processed through standard conditions.

Likewise, increased glycerin or flavor can be utilized. By choosing a sorbitol that has a sufficiently small particle size, an increase in glycerin or flavor can be used without compromising the rigidity of the chewing gum.

By way of example, and not limitation, examples of chewing gum compositions having increased moisture, glycerin, and flavor will now be given:

EXPERIMENT NO. 1

1) Torque Rheometry Procedure

To measure torque, a torque rheometer (Haake Rheocord 90), which includes controls and recording equipment, is used. Also included is a Rheomix 600 mixing bowl with ram and roller blades. To test the torque of gums with respect to sorbitol, gum base, glycerin at constant moisture level, sorbitols to be tested, and optional flavors are used. Programmed conditions are 25 minutes running time, 120° F. control jacket temperature, and 20 rpm rotor speed.

After calibration as described in the Rheocord 90 manual, 20.0 grams of gum base is added to the running mixing bowl, the ram is lowered to position and mixed for 2 minutes. After 2 minutes, the ram is raised, 39.0 grams of sorbitol is added and pressed into the bowl by lowering the ram into the bowl.

Figure 1:
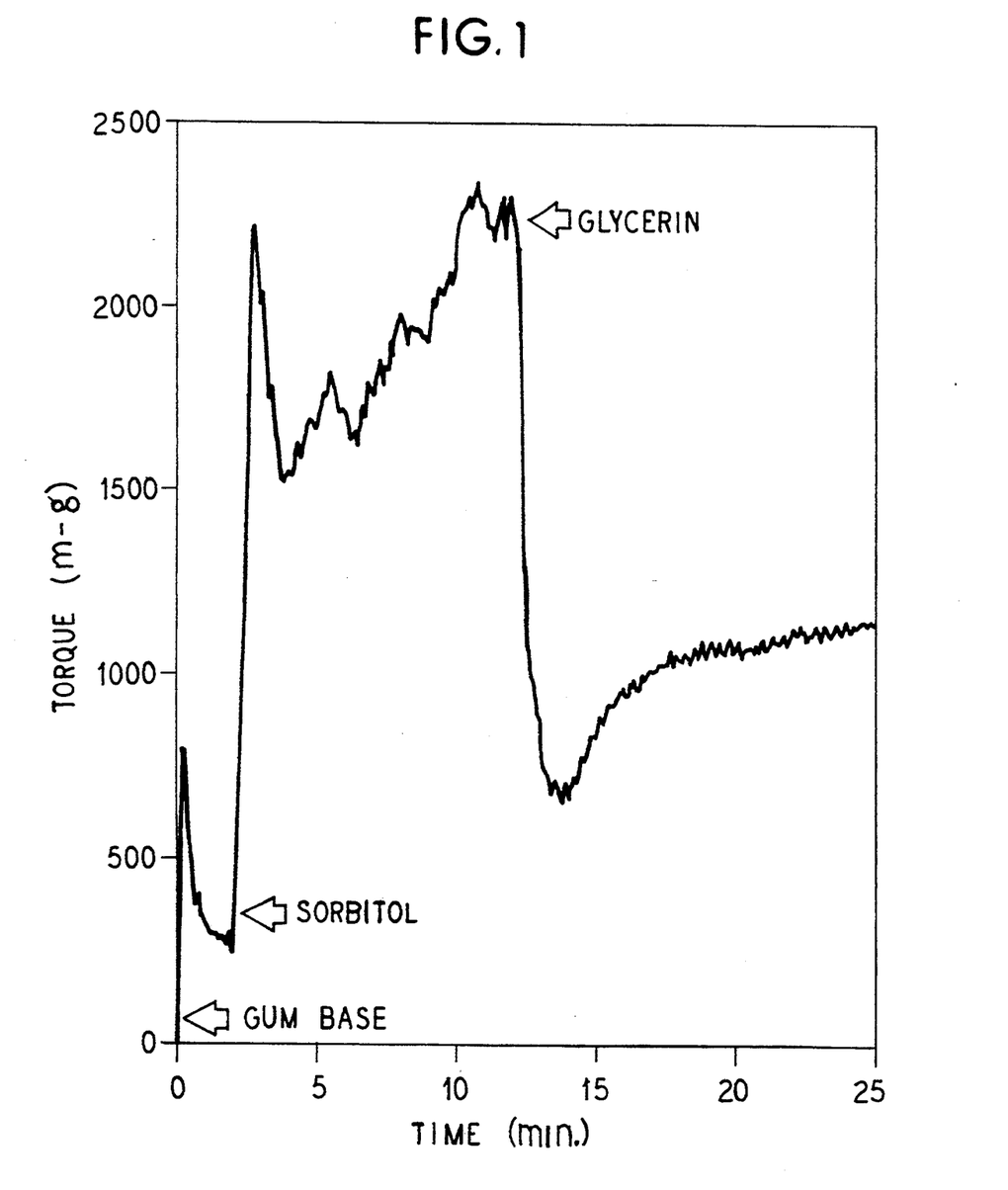
FIG. 1 illustrates torque over time for chewing gum base and sorbitol with glycerin.

At 12 minutes, the ram is again raised, 6.0 grams of glycerin is added, and the ram is again lowered. Torque measurement continues to run for 25 minutes and a typical graph as shown in FIG. 1 is obtained. Optionally, 1.00 gram of flavor may be added at 20 minutes and torque measurement in MG (meter-grams) continues up to 25 minutes.

2) Resulting Torque-Time Graph (FIG. 1)

In the first 2 minutes, gum base is heated and softens to give a low torque reading. At 2 minutes, sorbitol is added and torque increases significantly. The torque level drops as the temperature of the mix increases, but then torque increases slightly as sorbitol becomes more intimately mixed with the base. At 12 minutes, when glycerin is added, torque again is reduced, but increases as glycerin absorbs into the base/sorbitol matrix.

Here is where differences in sorbitol particle size effects torque of the chewing gum. With large particle size sorbitol, glycerin slowly absorbs into the base/sorbitol matrix and the gum torque would increase very slowly. With small particle size sorbitol, glycerin quickly absorbs into the base/sorbitol matrix and the gum torque would increase very quickly. If mixing continued for long periods of time, glycerin would be completely absorbed into the base/sorbitol matrix and the torque reading would be the same, independent of particle size.

However, actual chewing gum manufacturing does not allow complete absorption of glycerin in the sorbitol/base matrix, and gum is removed from the mixer before complete absorption of glycerin occurs. This will result in the gum being too soft for processing with large particle size sorbitol and firmer for smaller particle size sorbitol. Within a few days after manufacture, all the glycerin is absorbed into the sorbitol/base matrix and gum has the same texture for chewing and sensory. But for processing in the first few days, firmer gum for sheeting and wrapping is highly preferred.

Figure 2:
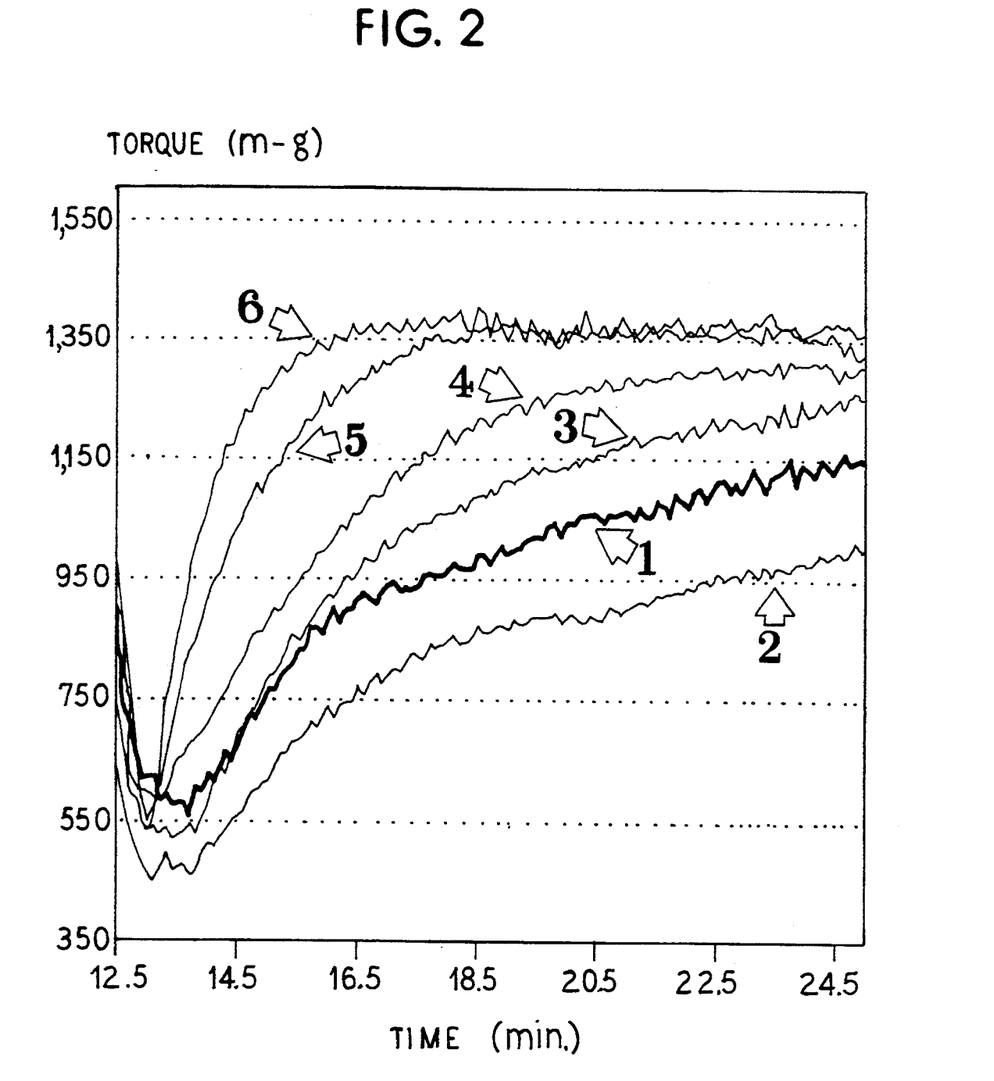
FIG. 2 illustrates torque over time for a sorbitol composition as a whole and specific particle size ranges of the same sorbitol.

The following examples (Examples 1–6) demonstrate the effect of particle size sorbitol on torque and are shown in FIG. 2.

Example No. 1

Sorbitol P60 from Roquette Corp. having the following particle size distribution was evaluated by torque activity:
- on 80 mesh (greater than 177 microns)-55.1%
- through 80 mesh, on 100 mesh (149–177 microns)-8.8%
- through 100 mesh, on 140 mesh (105–149 microns)-15.0%
- through 140 mesh, on 200 mesh (74–105 microns)-9.6%
- through 200 mesh (less than 74 microns)-11.4%

Example No. 2

Sorbitol P60 from Roquette Corp. was screened, physically separated to obtain sufficient quantity of sorbitol on 80 mesh to evaluate by the Torque Rheometry procedure.

Example No. 3

Sorbitol P60 from Roquette Corp. was screened to obtain sufficient quantity of material through 80 mesh and on 100 mesh to evaluate by the Torque Rheometry procedure.

Example No. 4

Sorbitol P60 from Roquette Corp. was screened to obtain sufficient quantity of material through 100 mesh and on 140 mesh to evaluate by the Torque Rheometry procedure.

Example No. 5

Sorbitol P60 from Roquette Corp. was screened to obtain sufficient quantity of material through 140 mesh and 200 mesh to evaluate by the Torque Rheometry procedure.

Example No. 6

Sorbitol P60 from Roquette Corp. was screened to obtain sufficient quantity of material through 200 mesh to evaluate by the Torque Rheometry procedure.

FIG. 2 illustrates that from 12.5 minutes (after glycerin is added) to 25 minutes, gum is softer with large particle size sorbitol and becomes firmer very slowly, whereas with small particle size sorbitol, torque increases quickly which means the gum becomes firmer much faster during this mixing time. If torque measurements were to continue past 25 minutes, the torque reading would eventually equilibrate to the same level independent of particle size.

Figure 3:
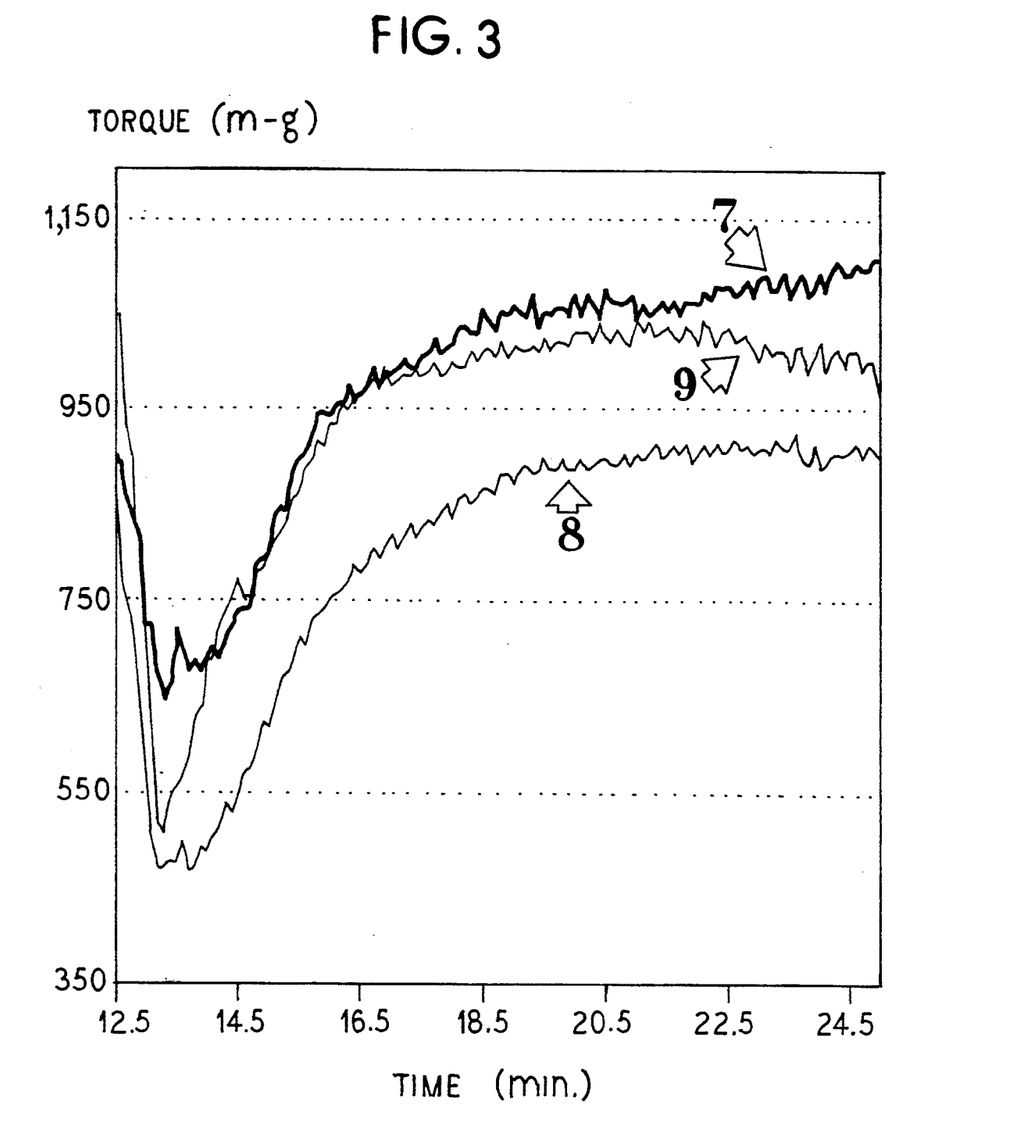
FIG. 3 illustrates torque over time for a sorbitol composition as a whole, the effect of increased moisture levels on the sorbitol composition as a whole, and the effect of increased moisture level on the sorbitol composition having smaller particle size.
Figure 4:
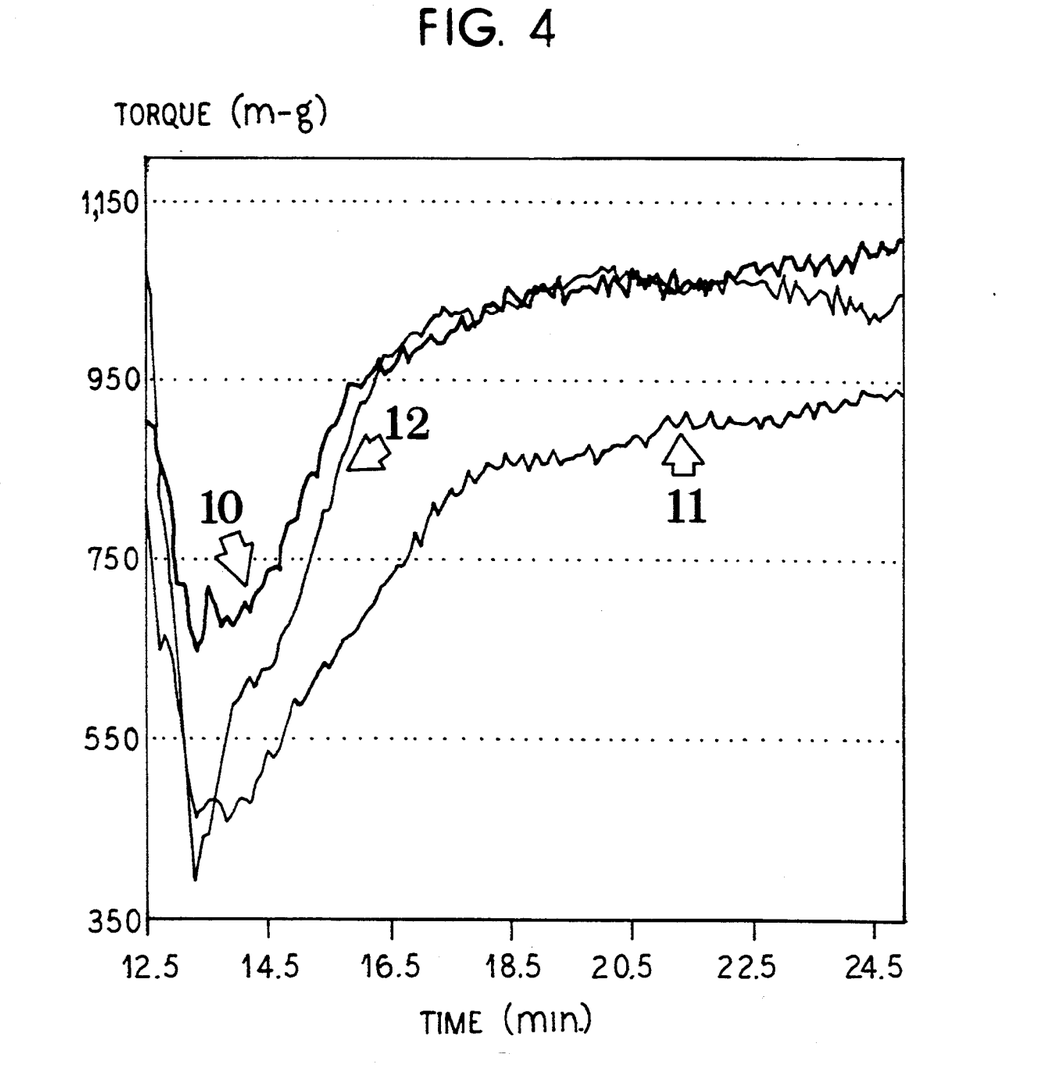
FIG. 4 illustrates torque over time for a sorbitol composition as a whole, the effect of increased glycerin levels on the sorbitol composition as a whole, and the effect of increased glycerin level on the sorbitol composition having smaller particle size.
Figure 5:
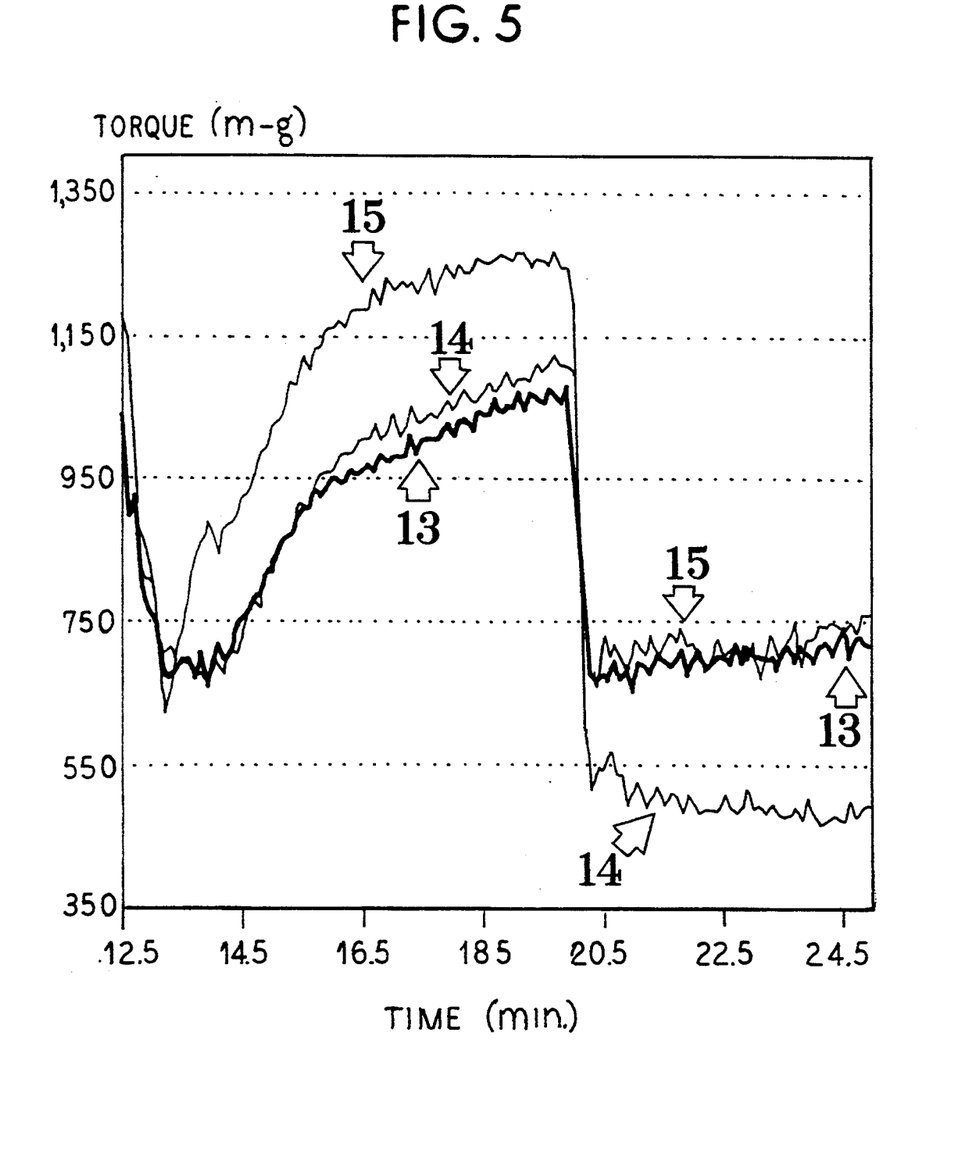
FIG. 5 illustrates torque over time for a sorbitol composition as a whole and the effect of increased flavor levels on the sorbitol composition as a whole, and the effect of increased flavor levels on the sorbitol composition having smaller particle size.

The gum processing improvement of using smaller particle size sorbitol can also have an effect on the gum formulation. Softer gum formulations may be made, but processing will be easier since the gum will have a firmer texture for processing. The following examples (Example Nos. 7–15) demonstrate this. (FIGS. 3, 4, and 5.)

Example No. 7

Another sample of Sorbitol P60 from Roquette Corp. having the following particle size distribution was evaluated by the Torque Rheometry procedure.
- on 80 mesh-51.8%
- through 80 mesh, on 100 mesh-8.2%
- through 100 mesh, on 140 mesh-14.3%
- through 140 mesh, on 200 mesh-11.2%
- through 200 mesh-14.5%

Example No. 8

Sorbitol P60 used in Example No. 7 was evaluated by the Torque Rheometry procedure, but to the glycerin used in the procedure was added 0.48 grams of water.

Example No. 9

Sorbitol P60 used on Example No. 7 was screened to remove all particles greater than 80 mesh. The remaining material was evaluated using 0.48 grams of water added to the glycerin used in the Torque Rheometry procedure.

The results which are shown in FIG. 3 demonstrate the effect of added moisture in gum by making the gum softer throughout the mix (Examples 7 vs. 8). By using a smaller particle size sorbitol, the gum has the same softness at about 13.5 minutes but becomes tougher faster and brings it to the same level as Example No. 7 (from about 14 to about 20 minutes). This provides it with the same processing properties. If mixing continued past 25 minutes, Example Nos. 8 and 9 would eventually have the same torque when the gums are equilibrated. At that point, gums will have the same texture independent of particle size.

The same effect can be seen for gum formulations when the level of glycerin is increased as in FIG. 4 for the following examples:

Example No. 10

This example is the same as Example No. 7.

Example No. 11

Sorbitol P60 used in Example 10 was evaluated by the Torque Rheometry procedures, but 8.0 grams of glycerin were added instead of 6.0 grams of glycerin.

Example No. 12

The same material used in Example No. 9, which had particles removed that were greater than 80 mesh was evaluated by the Torque Rheometry procedure, except that 8.0 grams of glycerin was used instead of 6.0 grams of glycerin.

The results which are illustrated in FIG. 4 demonstrate the effect of added glycerin in gum by making the gum softer (lower torque) throughout the mix (Example Nos. 10 vs. 11). By using a smaller particle size sorbitol, the gum has the same softness at about 13.5 minutes, but becomes tougher faster and brings it to the same level as Example No. 10 (from about 14 to about 20 minutes). This provides the same processing properties for sheeting and wrapping. If mixing continued past 25 minutes, Examples No. 11 and 12 would eventually have the same torque, when the gums are equilibrated. At that point, gums will have the same texture, independent of particle size.

In a similar manner, flavor also has an effect on gum texture. By using smaller particle size sorbitol, more flavor can be added and still obtain the same gum texture for processing as demonstrated in FIG. 5 for the following examples.

Example No. 13

Sorbitol P60 used in Example No. 7 was evaluated in the Torque Rheometry procedure, but at 20 minutes, 1.00 gram of spearmint flavor was added.

Example No. 14

Sorbitol P60 used in Example No. 7 was evaluated in the Torque Rheometry procedure, but at 20 minutes, 1.75 grams of spearmint flavor was added.

Example No. 15

The same material used in Example No. 9 which had particle sizes removed that were greater than 80 mesh was evaluated by the Torque Rheometry procedure. At 20 minutes, 1.75 grams of spearmint flavor was added.

The results, which are illustrated in FIG. 5, demonstrate that an increase in flavor level softens gum (lower torque) during processing, comparing Examples 13 vs. 14, but this can be compensated by using small particle size sorbitol to give a tougher texture for processing.

Figure 6:
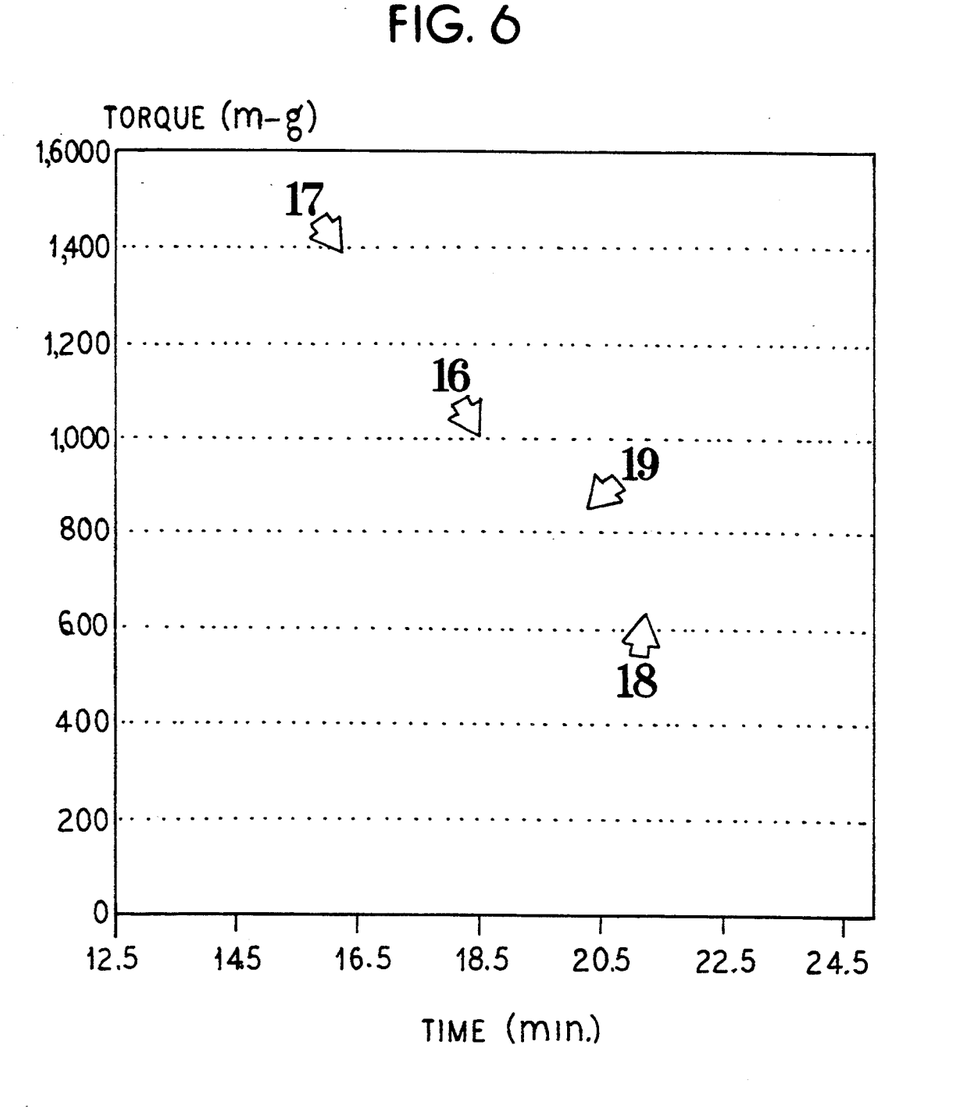
FIG. 6 illustrates torque over time for two types of sorbitol compositions as a whole, and two types of sorbitol compositions having smaller particle size.

The following examples demonstrate differences in fine particle size sorbitols from Roquette and from ICI (FIG. 6).

Example No. 16

This example, which is Roquette P60, is the same as Example No. 1.

Example No. 17

This example, which is Roquette P60, is the same as Example No. 6.

Example No. 18

Sorbitol from ICI called XS834 having the following particle size distribution was evaluated by the Torque Rheometry procedure:
retained on 80 mesh-64.9%
through 80 mesh, on 100 mesh-7.4%
through 100 mesh, on 140 mesh-13.8%
through 140 mesh, on 200 mesh-6.1%
through 200 mesh-7.7%.

Example No. 19

Sorbitol ICI XS 834 used in Example 18 was screened to obtain sufficient quantity of material through 200 mesh to evaluate by the Torque Rheometry procedure.

The results which are shown in FIG. 6 demonstrate first that both ICI sorbitols of Example 18 and 19 give softer gum than the Roquette sorbitols. Secondly, the differences in torque at about 13.5 to about 20 minutes between the ICI whole sorbitol and ICI through 200 mesh (Examples 18 vs. 19) is relatively small compared to the torque between the whole and screened sorbitol of Roquette between 13.5 and about 20 minutes (Examples 16 vs. 17). This indicates that the fine particles of ICI sorbitol in a gum formulation would not result in significantly firmer texture and significant processing improvements.

It should be understood that various changes and modifications to the presently preferred embodiments described herein will be apparent to those skilled in the art. Such changes and modifications can be made without departing from the spirit and scope of the present invention and without diminishing its attendant advantages. It is therefore intended that such changes and modifications be covered by the appended claims.

I claim:

1. A method for regulating the firmness of a chewing gum composition that includes sorbitol during the processing of the chewing gum composition comprising the steps of:
    adding and mixing chewing gum ingredients, including sorbitol, together;
    selecting the particle size distribution of the sorbitol that is added to the other ingredients of the chewing gum composition so as to create a chewing gum having desired firmness during processing, including the step of adding sorbitol having a reduced particle size to other components of a chewing gum composition to create a chewing gum composition having increased firmness during the processing of the chewing gum composition or adding sorbitol having a larger particle size to other components of a chewing gum composition to create a chewing gum composition having reduced firmness during the processing of the chewing gum composition; and
    processing the chewing gum composition to create a chewing gum product.

2. The method of claim 1 wherein the sorbitol has a particle distribution as follows:

0 to 2% retained on #80 sieve
10 to 25% retained on #100 sieve
20 to 50% retained on #140 sieve
10–30% retained on #200 sieve
10 to 50% passed through #200 sieve.

3. The method of claim 1 wherein the sorbitol has a particle distribution as follows:
0 to 2% retained on #140 sieve
30 to 70% retained on #200 sieve
30 to 70% passed through #200 sieve.

4. The method of claim 1 wherein the chewing gum composition is sugar free.

5. The method of claim 1 wherein the sorbitol comprises approximately 30 to about 70 wt % of the chewing gum composition.

6. A method for increasing moisture in a chewing gum that includes sorbitol as compared to a similar chewing gum, and maintaining similar processability as compared to the similar chewing gum comprising the steps of:
adding and mixing gum ingredients to create a chewing gum composition that is substantially similar to a typical chewing gum composition;
increasing the moisture in the chewing gum composition as compared to the moisture content of the typical chewing gum composition; and
during the processing of the chewing gum composition reducing the particle size of the sorbitol that is added to other chewing gum ingredients in the chewing gum composition as compared to the particle size of the sorbitol used to construct the typical chewing gum composition.

7. The method of claim 6 wherein the sorbitol has a particle distribution as follows:
0 to 2% retained on #80 sieve
10 to 25% retained on #100 sieve
20 to 50% retained on #140 sieve
10–30% retained on #200 sieve
10 to 50% passed through #200 sieve.

8. The method of claim 6 wherein the sorbitol has a particle distribution as follows:
0 to 2% retained on #140 sieve
30 to 70% retained on #200 sieve
30 to 70% passed through #200 sieve.

9. The method of claim 6 wherein the chewing gum composition is sugar free.

10. The method of claim 6 wherein the sorbitol comprises approximately 30 to about 70 wt % of the chewing gum composition.

11. A method for increasing the flavor in a chewing gum that includes sorbitol as compared to a similar chewing gum, and maintaining similar processability as compared to the similar chewing gum comprising the steps of:
adding and mixing gum ingredients to create a chewing gum composition that is substantially similar to a typical chewing gum composition;
increasing the flavor in the chewing gum composition as compared to the typical chewing gum composition; and
during processing of the chewing gum composition, reducing the particle size of the sorbitol that is added to other chewing gum components used in the chewing gum composition to the particle size of the sorbitol used in the formula to construct the typical chewing gum composition.

12. The method of claim 11 wherein the sorbitol has a particle distribution as follows:
0 to 2% retained on #80 sieve
10 to 25% retained on #100 sieve
20 to 50% retained on #140 sieve
10–30% retained on #200 sieve
10 to 50% passed through #200 sieve.

13. The method of claim 11 wherein the sorbitol has a particle distribution as follows:
0 to 2% retained on #140 sieve
30 to 70% retained on #200 sieve
30 to 70% passed through #200 sieve.

14. The method of claim 11 wherein the chewing gum composition is sugar free.

15. The method of claim 11 wherein the sorbitol comprises approximately 30 to about 70 wt % of the chewing gum composition.

16. A method for increasing glycerin content in a chewing gum that includes sorbitol as compared to similar chewing gum, and maintaining similar processability as compared to the similar chewing gum comprising the steps of:
adding and mixing gum ingredients to create a chewing gum composition that is substantially similar to a typical chewing gum composition;
increasing the glycerin content in the chewing gum composition as compared to the typical chewing gum composition; and
during processing of the chewing gum composition reducing the particle size of the sorbitol that is added to other chewing gum ingredients used to construct the chewing gum composition as compared to the particle size of the sorbitol used to construct typical chewing gum composition.

17. The method of claim 16 wherein the sorbitol has a particle distribution as follows:
0 to 2% retained on #80 sieve
10 to 25% retained on #100 sieve
20 to 50% retained on #140 sieve
10–30% retained on #200 sieve
10 to 50% passed through #200 sieve.

18. The method of claim 16 wherein the sorbitol has a particle distribution as follows:
0 to 2% retained on #140 sieve
30 to 70% retained on #200 sieve
30 to 70% passed through #200 sieve.

19. The method of claim 16 wherein the chewing gum composition is sugar free.

20. The method of claim 16 wherein the sorbitol comprises approximately 30 to about 70 wt % of the chewing gum composition.

* * * * *

UNITED STATES PATENT AND TRADEMARK OFFICE
CERTIFICATE OF CORRECTION

PATENT NO. : 5,405,623
DATED : April 11, 1995
INVENTOR(S) : Barkalow et al.

It is certified that error appears in the above-indentified patent and that said Letters Patent is hereby corrected as shown below:

The drawing sheet, consisting of Figure 6, should be deleted to be replaced with the drawing sheet, consisting of Figure 6, as shown on the attached page.

Signed and Sealed this

Seventeenth Day of October, 1995

Attest:

BRUCE LEHMAN

Attesting Officer     Commissioner of Patents and Trademarks

FIG. 6